United States Patent

Yokoyama et al.

Patent Number: 5,180,596
Date of Patent: Jan. 19, 1993

[54] METHOD FOR RIPENING CHEESE UNDER HIGH PRESSURE

[75] Inventors: Hitoshi Yokoyama, Sennan; Norio Sawamura, Hashimoto; Noriko Motobayashi, Kaizuka, all of Japan

[73] Assignee: Fuji Oil Co., Ltd., Osaka, Japan

[21] Appl. No.: 737,232

[22] Filed: Jul. 29, 1991

[30] Foreign Application Priority Data

Jul. 31, 1990 [JP] Japan .................. 2-204465

[51] Int. Cl.$^5$ .............................. A23C 9/12
[52] U.S. Cl. ........................ 426/36; 426/34; 426/42; 426/43
[58] Field of Search ............ 426/34, 36, 37, 42, 426/43, 582

[56] References Cited

U.S. PATENT DOCUMENTS 4,770,882  9/1988  Ingouf et al. ............... 426/36
4,965,078  10/1990  Van Leeuwen et al. ....... 426/36 X Primary Examiner—Joseph Golian
Assistant Examiner—Leslie Wong
Attorney, Agent, or Firm—Wenderoth, Lind & Ponack

[57] ABSTRACT

A method of producing cheese by ripening the cheese under high pressure, e.g. between 100 to 2500 kg/cm$^2$. Ripening the cheese under high pressure significantly shortens the period of time required for ripening, while having no adverse effect on the flavor and testure of the cheese as compared to cheese ripened in the conventional manner. Ripening the cheese also reduces the proliferation of contaminant microorganisms.

4 Claims, No Drawings

METHOD FOR RIPENING CHEESE UNDER HIGH PRESSURE

BACKGROUND OF THE INVENTION

1. Field of the Invention

The present invention generally relates to a method for producing cheese, and more particularly to a method for shortening the ripening process which requires a long time for the manufacture of the cheese.

2. Description of the Prior Art

The latest westernization of eating habits has made use of cheese in a variety of foods at an increasing ratio. There are various kinds of cheese and the methods of producing them are diverse. However, a common disadvantage encountered in the use of these methods is the considerably long period of time needed for ripening. Ripening is necessary to develop the taste and texture, etc. of the cheese, which is carried out in the presence of lactobacilli, enzyme or the like. Ripening takes several weeks to half a year at a minimum and one or more years in general. As ripening proceeds gradually during this long term by the action of the lactobacilli or enzyme added, the taste and texture of cheese result in harmony. The formation of the taste and texture is greatly dependent on the ripening term, kind of microorganism and adding amount of microorganism added, and further dependent on the temperature and moisture, so that every kind of cheese has its own taste and texture. Moreover, people cherish the traditional qualities characteristic to each kind of cheese or each location of production.

However, the above-mentioned long term necessary for ripening undesirably increases the cost of the cheese and causes a delay in responding to a change in demand.

More specifically, since several weeks or one year is necessary for ripening, a large amount of money and labor is necessitated for maintaining the raw material, ripening place, and control of the ripening conditions, etc. during the term. As a result, the manufacturing cost of the cheese is raised. Therefore, it has been strongly desired to shorten the ripening term to produce, particularly, to mass-produce the cheese.

Meanwhile, there are some proposals made to shorten the ripening term. For example, it is disclosed in Japanese Patent Publication No. 56-29973 (29973/1981) to improve the starter material, whereby the ripening term is reduced to 3-4 weeks from several months. Likewise, Japanese Patent Publication No. 56-38169 (38169/1981) discloses raising the ratio of moisture to shorten the fermentation term to ten days. According to another Japanese Patent No. 63-502877 (502877/1988), it is suggested to leave the cheese in an electric field during a part of the ripening term, so that the ripening term can be reduced to approximately four weeks.

In any method referred to above, however, ten or more days are still required for ripening. The method by the Japanese Patent Publication No. 56-38169 is applicable only to liquid cheese. Therefore, the above known methods are not considered very suitable to shorten the ripening term.

In addition, liquid cheese is unstable from a viewpoint of the microorganism, and therefore it is prone to bring about an unfavorable flavor called off-flavor or deteriorate the balance of taste due to the generation of bitterness.

SUMMARY OF THE INVENTION

An essential object of the present invention is to provide a method for producing cheese in a state that the taste, texture, etc. are fully developed, while considerably shortening the ripening term.

Noting that the microorganisms are multiply less as the pressure is raised and finally die under the high pressure, the inventors of the present invention have found it possible to control the action of a specific microorganism by controlling the pressure. The present invention has been accomplished from further studies by application of the above finding.

The ripening method of cheese and the like according to the present invention is characterized in that the cheese is ripened in the presence of lactobacilli and, if necessary, an enzyme under a pressure of 100-2500 $kg/cm^2$.

The fundamental aspects of the present invention will be discussed hereinbelow.

The kind of cheese to which the present invention is applicable is not specifically restricted, but any kind will do so long as it develops a cheese-like taste through ripening under anaerobic conditions. The present invention is particularly advantageous to a kind of cheese which requires a long term for ripening.

For example, the present invention may be applied to a traditional cheese which is produced by ripening of milk after whey is separated therefrom or a so-called imitation cheese which is obtained from cheese-like emulsified material using lactic fat or vegetable oil as fat and an oil component and, skim milk or vegetable protein as protein component.

Generally, the typical method of producing cheese includes a preparatory step to heat and sterilize the raw milk, a step to add a starter material such as lactobacilli, etc., a coagulating step to add a coagulant such as rennet, a curd step to remove the whey and to cut, stir, heat and the coagulated milk and to add salt, a pressurizing-/molding step, a coating step to apply paraffin, and a ripening step, etc.

To remove the whey, the traditional squeezing method or modern ultrafiltration method is employed. The cheese-like food called imitation cheese is obtained without removing the whey. The ripening method of the present invention is applicable to any method of producing cheese as described above, and has the remarkable effect of shortening the ripening time.

Regarding the pressure to be maintained during ripening, 100-2500 $kg/cm^2$ is preferable. If the pressure is lower than 100 $kg/cm^2$, little effect is expected even through the control of the other ripening conditions. If the pressure exceeds 2500 $kg/cm^2$, the activity of the lactobacilli is extraordinarily reduced, which is not beneficial to the promotion of ripening.

The cheese curd is sealed in vacuum within a waterproof container made of a synthetic resin film and is placed in a pressure resistant container filled with water. A cylinder-shaped pressuring part is provided in a part of the pressure resistant container. Therefore, when the pressure resistant container is pressurized by means of a piston of the cylinder, the material is placed under pressure. Although the piston is driven generally by oil pressure, a load may be added in the case where the pressure is relatively small.

The number of lactobacilli to be added to the material is desirably larger than that used in the general manufacturing method. Although it is, to add approximately $10^6$ lactobacilli per 1 g of solid components of the material, according to the present invention, ten times that quantity, namely, $10^7$ or more is preferably added for 1 g of solid components. This is to accelerate ripening by compensating for the suppressed propagation of the lactobacilli under the high pressure.

Since it is desirable that $10^7$ or more lactobacilli are present per 1 gram of solid components at the pressurizing/ripening stage as is mentioned hereabove, lactobacilli of a conventional strain are condensed to ten or more times by a centrifuge and added immediately before the ripening step, or, the lactobacilli are added in a general manner and multiplied before the curd is separated.

Any kind of lactobacilli used in the general production of cheese is employable in the present invention, e.g., Streptococcus lactis, Str. thermophilus, Str. durans, Str. faecalis, Lactobacillus bulgarius, Lact. casei, etc. The heat-resistance of properties of these lactobacilli are different from each other. However, since the activity of the lactobacilli during ripening under high pressure according to the present invention is greatly influenced by the pressure rather than the temperature, the ripening temperature is not particularly specified so long as it does not kill the lactobacilli. It is sufficient to control the temperature near the proper temperature of the microorganism used for ripening.

Besides the lactobacilli, enzymes such as protease, lipase or the like can be added as necessary. The origin of the enzyme is not particularly limited. Accordingly, both the enzymes referred to above and the enzymes of the lactobacilli work together to foster the taste and composition of the particular cheese produced.

The ripening condition is determined by the temperature, pH, moisture and concentration of the salt added in addition to the above-described pressure, lactobacilli and enzyme requirements. The present invention requires no special specification for these factors, and is applicable not only under the conditions of the general producing method, but so long as the activity of the lactobacilli is not brought to a halt.

If the ripening condition is kept satisfactory as described above, the ripening time can be reduced remarkably. For example, although it conventionally takes 6 months to ripen Cheddar cheese, three days brings about its equivalent according to the present invention.

In the meantime, the most annoying hindrance to ripen cheese is the propagation of various undesirable microorganisms. Needless to say, the raw material should be sterilized to control their propagation, and at the same time, moisture, pH, salt and temperature are controlled to suppress their propagation. Before now, ripening proceeded gradually over a long time, providing more time for the undesirable microorganisms to multiply. In contrast, the propagation of the undesirable, as well as the desirable, microorganisms is controlled by the pressure used in the present invention.

Therefore, the conditions and steps taken to control proliferation of undesirable microorganisms may be less strictly using the present process.

Since the propagation of microorganisms under a high pressure decreases in accordance with an increase in pressure, the activity of the microorganisms can be controlled by controlling the pressure. The present invention utilizes this controlling effect. In other words, ripening is carried out under a high pressure in a short time in the presence of an excessive amount of lactobacilli while suppressing the multiplication of the various contaminant microorganisms. As a result, ripening is effective under any condition of moisture, pH, salt and temperature. The present invention makes it possible to produce low-salt cheese or to raise the temperature to accelerate ripening.

The enzyme added as well as the enzyme of the lactobacilli work in combination during ripening. Accordingly, the ripening speed is increased.

DESCRIPTION OF THE PREFERRED EMBODIMENTS

Preferred embodiments of the present invention will be discussed more in detail below.

EMBODIMENT 1

COMPARATIVE EXAMPLE 1

100 parts of raw milk (containing fat by 3.1%) is sterilized at 75° C. for 15 sec. and cooled to 30° C. Thereafter, 1.5 parts of a starter of lactobacilli (BD starter by Handsen Co., Ltd.: concentration $15 \times 10^8$/g), 0.1 part of calcium chloride and 0.003 part of rennet (liquid type by Dairy Land Food Laboratory Co., Ltd.) are added, thereby to obtain a coagulated milk curd. The obtained curd is cut to the size of a soya bean. After stirring, about ⅓ whey is removed. The curd is heated to 40° C. to ferment for 90 min. Then, the remaining whey is nearly completely removed. The resultant curd is treated by Cheddaring and milling and then, added with 3 parts of refined salt, stirred and mixed uniformly. The curd after molding is sent to the preliminary squeezing process to the main squeezing process with the pressure 5 kg/cm² for day and night. The curd is subsequently cut to 10 cm cubes, put in a bag of polyethylene and sealed in vacuum. Thereafter, the sealed cubes are left in a pressure resistant container filled with water at 25° C. for three days under the pressure (kg/cm²) described in Table 1.

The quality of the finished Cheddar cheese is compared with respect to the total containing amount of amino acid (mg/g) and taste.

A commercially-available Cheddar cheese (ripened in 6 months) and a cheese produced in the same manner as in Embodiment 1 with the ordinary pressure (Comparative example 1) are also described in Table 1 for comparison.

TABLE 1

|  | Embodiment 1 | | | | | Comparative Example 1 | Commercial cheese |
|---|---|---|---|---|---|---|---|
| Pressure | 50 | 150 | 500 | 2000 | 3000 | 1 | — |
| Total amount of amino acid | 16.2 | 20.3 | 26.5 | 25.3 | 5.2 | 15.3 | 21.3 |

TABLE 1-continued

| | Embodiment 1 | | | | | Comparative Example 1 | Commercial cheese |
|---|---|---|---|---|---|---|---|
| Pressure | 50 | 150 | 500 | 2000 | 3000 | 1 | — |
| Taste | x | ○ | ⓒ | ○ | x | x | ⓒ |

ⓒ : considerably superior.
○ : superior.
x : insufficient in cheese taste.

EMBODIMENT 2
COMPARATIVE EXAMPLE 2

In Embodiment 2, when 3 parts of refined salt is added to the curd prepared in the same manner as in Embodiment 1, 0.1 part of Italase (Dairy Land Food Laboratory Co., Ltd.) as lipase and 0.2 part of Protin FN (Daiwa Chemical Co., Ltd.) as protease are added simultaneously. Parmesan cheese is produced under the pressure 500 kg/cm² in the manner totally equal to in Embodiment 1. The quality, etc. are compared as shown in Table 2.

TABLE 2

| | Embodiment 2 | Comparative example 2 | Commercial cheese |
|---|---|---|---|
| Total amount of amino acid | 76.7 | 68.4 | 88.7 |
| Taste | ⓒ | x* | ⓒ |

*: some bitterness

EMBODIMENT 3
COMPARATIVE EXAMPLE 3

16 parts of milk fat, 15 parts of casein sodium, one part of powdered skim milk, 68 parts of water, 3 parts of salt, 0.2 part of extract of enzyme, 0.5 part of secondary sodium phosphate (12H2O), and 0.1 part of lecithin are added, stirred, emulsified, heated and sterilized at 80° C. for 10 min., which is then cooled to 35° C. thereby obtaining emulsified paste.

Thereafter, 1.5 parts of a starter of lactobacilli (BD starter by Handsen Co., Ltd.: concentration $20 \times 10^8$/g), 0.05 part of protin FN (Daiwa Chemical Co., Ltd.) and 0.05 part of italase are added to the emulsified paste. The material is filled in a bag of polyethylene to be left for three days under the pressure 700 kg/cm².

For the purpose of comparison, Comparative example 3 which is obtained by leaving the above material filled in a polyethylene bag for three days under the atmospheric pressure is shown in Table 3 as well.

TABLE 3

| | Embodiment 3 | Comparative example 3 |
|---|---|---|
| Total amount of amino acid | 44.2 | 37.3 |
| Bitterness | ⓒ | x* |

*: bitterness is present

As is clear from the foregoing description, the material of cheese is ripened under the high pressure according to the present invention, whereby the desired taste and organization can be obtained in a considerably short time. The problems to which the conventional method cannot approach, i.e., that the manufacturing cost is high due to a long term of ripening and controlling difficulties of balance in supply and demand can be solved all at once.

What is claimed is:

1. A method for producing cheese, comprising a step of ripening the cheese under a pressure of 100–2500 kg/cm² in the presence of lactobacilli, the pressure reducing the ripening time.

2. The method as set forth in claim 1, wherein said lactobacilli are added in a concentration of $10^7$ or more per 1 gram of cheese based upon its solid component at the commencement of the ripening step.

3. A method for producing cheese, comprising a step of ripening the cheese under a pressure of 100–2500 kg/cm² in the presence of lactobacilli and enzyme, the pressure reducing the ripening time.

4. The method as set forth in claim 3, wherein said enzyme is at least one selected form the group consisting of lipase and protease.

* * * * *